United States Patent

Kadlez et al.

[11] 3,739,133
[45] June 12, 1973

[54] APPARATUS FOR WELDING TUBES INTO TUBE PLATES

[75] Inventors: Karl Kadlez; Adolf Marek, Vienna, both of Austria

[73] Assignee: Simmering-Graz-Pauker Aktiengesellschaft fur Maschinen-Kassel-und-Waggonbau, Vienna, Austria

[22] Filed: July 13, 1971

[21] Appl. No.: 162,046

[30] Foreign Application Priority Data
July 14, 1970 Austria..................................... 6381
June 9, 1971 Austria..................................... 4983

[52] U.S. Cl............... 219/60 A, 219/74, 219/125 R
[51] Int. Cl................................................ B23k 9/02
[58] Field of Search............... 219/60 A, 60 R, 125, 219/74, 75

[56] References Cited
UNITED STATES PATENTS

| | | | |
|---|---|---|---|
| 1,552,369 | 9/1925 | White | 219/74 |
| 3,673,373 | 6/1972 | Lovett | 219/74 |
| 2,866,074 | 12/1958 | Ronay | 219/74 |
| 2,938,106 | 5/1960 | Hawthorne | 219/125 |
| 2,760,044 | 8/1956 | Mott | 219/60 R |
| 2,908,805 | 10/1959 | Apblett et al. | 219/125 |
| 2,856,510 | 10/1958 | Jones et al. | 219/74 |

*Primary Examiner*—J. V. Truhe
*Assistant Examiner*—L. A. Schutzman
*Attorney*—Imirie and Smiley

[57] ABSTRACT

Apparatus for welding tubes to tube plates in an inert gas atmosphere comprises a welding head carrying a gas shield in surrounding relation to the welding electrode to confine the inert gas to the welding zone. The gas shield comprises heat-resisting insulating material to enable close juxtaposition to the electrode so as to confine the welding zone and the material also is flexible in order to maintain contact with the tube plate despite irregularities of the plate surface or the ends of the tubes secured thereto in order to exclude surrounding atmosphere from the welding zone. The welding head may have a slidably supported centering member including a mandrel portion for extending into a tube to center the head and a portion extending axially of the mandrel portion and carrying a similar gas shield of flexible material for engaging the inner surface of the tube after the mandrel has been withdrawn from the tube and during the welding operation.

12 Claims, 6 Drawing Figures

PATENTED JUN 12 1973 3,739,133
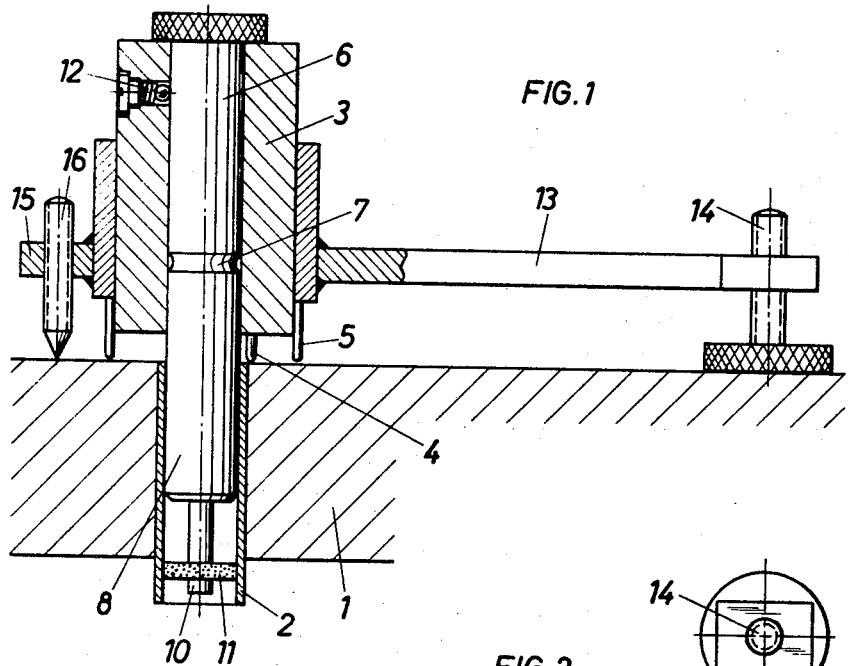
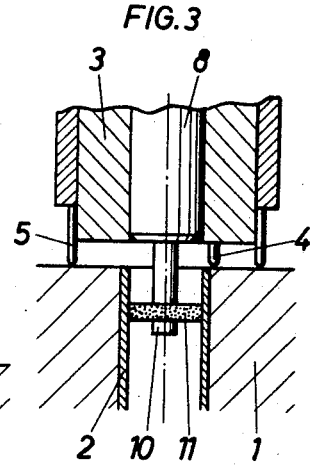
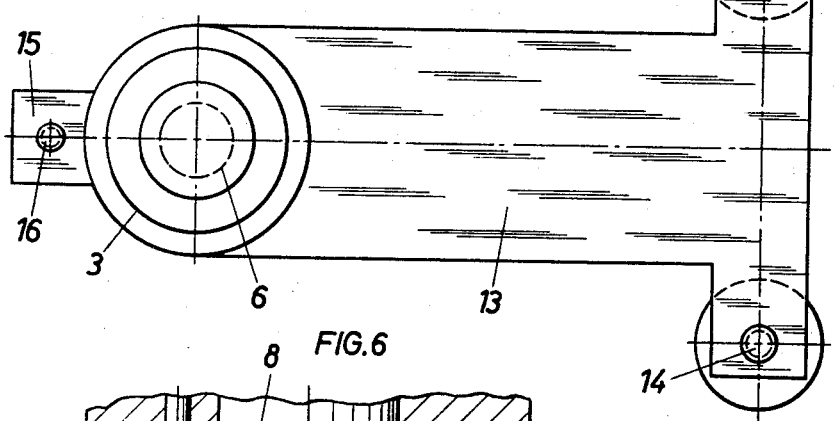
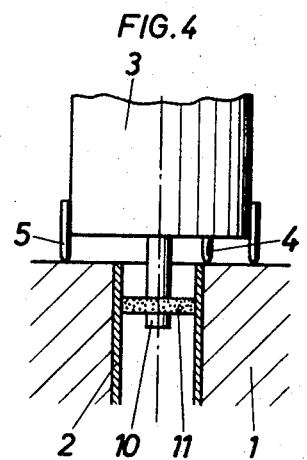
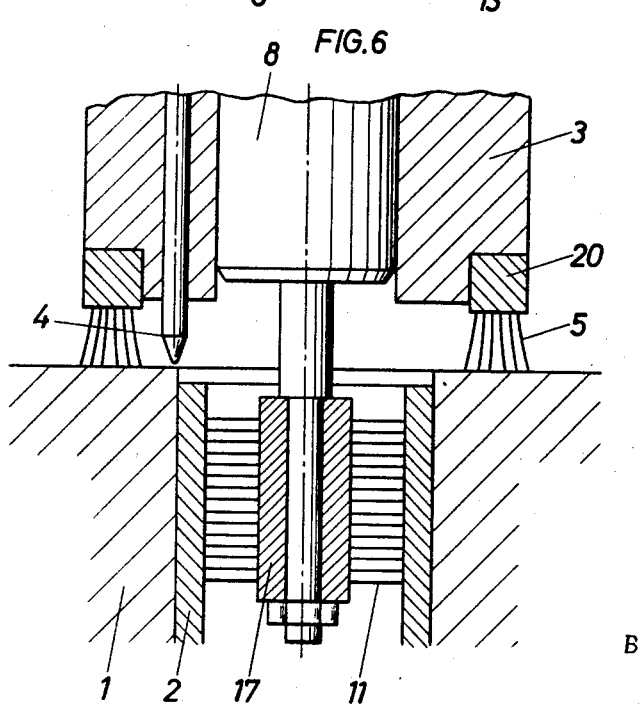
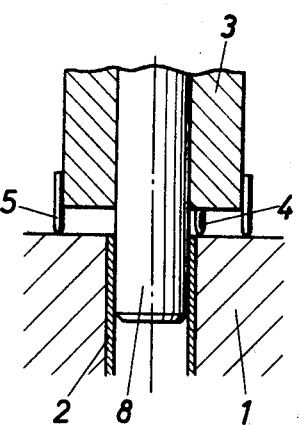
INVENTORS
KARL KADLEZ
ADOLF MAREK
BY *Imirie & Smiley*
ATTORNEYS

APPARATUS FOR WELDING TUBES INTO TUBE PLATES

Background of the Invention

Apparatus for welding tubes into tube plates in an inert gas atmosphere, in which apparatus the welding zone is covered by a gas shield of flexible material.

The invention provides an apparatus for welding tubes into tube plates in an inert gas atmosphere. In that apparatus the welding zone is protected toward the outside by a gas shield, which consists of heat-resisting insulating material and which covers the welding zone and is provided on the welding head and extends, if desired, also into the interior of the tube.

The invention provides also a process of making seam welds in an inert gas atmosphere between tube plates and tubes of heat exchangers in such a manner that the welding zone is optimally shielded against an ingress of the external atmosphere and the axis of the welding gun is exactly centered on the tube axis without a lateral offset or angular misalignment of the welding head used to make the seam. A poor shielding of the welding zone may result in porous seam welds whereas a lateral offset or an angular misalignment of the axis of the gun may result in a non-uniform melting of the joint zone and in a running of the molten material into the interior of the tube.

In known welding guns, the welding zone is centered with and sealed from the interior of the tube by means of expanding conical centering mandrels, which remain in the tube during the welding operation. When such welding guns are used to make weld beads which protrude into the tube, it may be difficult to remove the gun in spite of the expanding cone. Besides, it may be impossible to use an expanding conical mandrel for centering small tubes having an inside diameter of only a few millimeters. Whereas other designs enable an intersection of the tube axis and gun axis at the end of the tube, they do not ensure a coincidence of the two axes if any weld beads which are present cause the points of contact between the welding gun and the tube plate to be on different levels.

It is also known to enclose the welding zone and the inert gas space with a gas shield consisting of rigid metallic or ceramic materials. That gas shield is secured to and moved with the welding head. Such gas shields must be kept a predetermined distance apart from the tube plate so that they can be moved over uneven portions of the tube plate, excessively high seam welds and the like without suffering damage. Particularly during a welding on vertical tube walls, the gap between the gas shield and the workpiece involves a risk that the inert gas escapes quickly from the gas space and is contaminated by atmospheric air, which enters the inert gas space.

SUMMARY OF THE INVENTION

According to the invention, a heat-resisting insulated shield is suspended from the welding head, the shield being constituted by flexible material so that the lower edge of the gas shield can be disposed in contact with the surface of the workpiece regardless of variations in such surface. As a result, the gas space and the gas consumption may be small and yet the inert gas will not be contaminated by atmospheric air. Besides, any changes in the composition of the inert gas which may be required for metallurgical reasons during the welding operation can be carried out quickly and thoroughly.

According to another feature of the invention, an inner gas shield is secured, possibly with an interposed pin, to the lower end of a centering mandrel which is adapted to be inserted into the tube to be welded and adapted to e withdrawn from said tube before the welding operation. This feature eliminates the difficulties mentioned hereinbefore in connection with the known welding means as regards centering.

BRIEF DESCRIPTION OF THE DRAWING

FIG. 1 is an axial sectional view showing the apparatus according to the invention;

FIG. 2 is a top plan view showing the apparatus of FIG. 1;

FIG. 3 shows the apparatus of FIG. 1 in operating position, and

FIGS. 4 to 6 respectively show modifications of the apparatus of FIG. 1.

DETAILED DESCRIPTION OF THE INVENTION

FIG. 1 shows a tube plate 1, into which a tube 2 is inserted. A welding head 3 or a welding gun is centered on the inside diameter of the tube 2 by a mandrel 6. The welding head is provided with a holder, not shown, for receiving an electrode 4 and with at least one duct, also not shown, for conducting at least two inert gases into the region surrounding the electrode. The welding head is also provided with a cooling system, not shown. The foregoing elements are all well known in welding heads or guns of the present type.

A gas shield 5 of insulating, heat-resisting, flexible material is secured to the lower end of the welding head 3. This gas shield serves as a sealing element between the outer rim of the gun and the workpiece to protect the welding zone from an ingress of the external atmosphere.

The mandrel or guide pin 6 is axially slidably mounted in the welding head 3 or welding gun and is provided with a recess 7 for locating the pin 6 in operating position. In the present case, the recess 7 consists of an annular groove. The pin 6 terminates at its lower end in a centering mandrel 8, which determines the axial position of the welding head 3 or the welding gun relative to the tube 2.

A centering member 11 is coaxially secured by means of a pin 10 to the free end of the centering mandrel 8. The centering member consists of a material having properties which are similar to those of the gas shield 5 and forms a gas shield protecting the welding zone from the interior of the tube. At least the lower portion of the mandrel is cylindrical or profiled to fit the inside surface of the tube.

The axial movement of the mandrel is limited by stops or recesses in such a manner that the mandrel when extended centers the gun whereas the mandrel can be retracted from the welding zone to a position in which the centering member 11 remains as an inner seal in the tube. The welding head 3 contains a spring-loaded detent ball 12, which engages the recess 7 when the mandrel 8 is retracted.

The welding head 3 is held by a welding head carrier 13. The welding head is insulated from said carrier carried by a sleeve 18 at one end thereof. Two adjusting screws 14 are provided on both sides of the laterally protruding other end of the carrier 13. An eye lug 15 having an insulated spacing pin 16 is secured to the welding head 3 in a position which is diametrically opposite to the welding head carrier 13. The apparatus according to the invention is operated as follows:

When the centering mandrel 6 is extended (FIG. 1), the welding gun is positioned so that its axis coincides with that of the tube 2 to be welded. The elevation of the gun is determined by the spacing pin 16. By means of suitable adjusting elements, such as the adjusting screws 14, or by means of spring elements which can be fixed, the welding gun is held in position by a three-point support (FIG. 2). The centering mandrel can now be retracted from the tube 2 so that only the shield 11 remains in the tube 2 as a sealing and centering means and to hold the gun against lateral displacement.

The spacing pin 16 can be adjusted to such an effective height before the mounting of the gun that the outer gas shield 5 and the welding equipment contained in the head, in the present case the electrode 4, are spaced such a distance apart from the tube plate that optimum welding conditions are ensured as regards the length of the electric arc and the formation of a minimum clearance between the plate and the outer shield. Even when the end of the tube is constricted by the weld bead, this will not obstruct the removal of the welding gun because the inner gas shield 11 is flexible or in an adverse case will be torn off and can easily be replaced.

In special cases, the elements provided by the present invention may be used individually. For instance, the provision of an extensible centering mandrel is not required if the tube plate remains virtually flat in spite of weld beads so that the welding equipment will be held in its axial position by the centering plate and by the spacing pin 16, which must be adjusted only once. As is apparent from FIG. 4, the guide pin 6 and the mandrel 8 may be omitted in this case and the pin 10 which holds the centering member 11 is secured directly in the welding head.

Experience has shown that with tubes which are small in diameter the action of the inert gas will be less susceptible to an ingress of the external atmosphere through the interior of the tube. In such case, the inner gas shield may be omitted and the rugged centering mandrel alone may be used for centering in the manner described (FIG. 5).

During the development of the apparatus according to the invention it has been found that a gas shield having a considerable flexibility is required for certain fields of application. To ensure this considerable flexibility of the gas shield assembly, the gas shield 5 and the centering member 11 may consist of brushes or woven fabrics having an increased flexibility. The material used for this purpose must be heat-resisting and must have dielectric properties. These requirements are met, e.g., by mineral or ceramic fibers. In FIG. 6, elements 17 and 20 preferably are rigid carrier elements, by which the brushes or woven fabric layers, constituting the shield 11, are secured to the welding head and centering mandrel.

In the drawings, said sealing and centering elements are diagrammatically shown for pin electrodes 4, which are secured in head 3 and make the seam weld when a rotation is mechanically imparted to the head 3. The sealing and centering elements may similarly be used for welding equipment which is operated without a mechanical rotation but in which rotation is magnetically imparted to the electric arc struck from an electrode which is, e.g., cylindrical.

What is claimed is:

1. Apparatus for welding tubes in openings through tube plates while in an inert gas atmosphere, comprising:

a welding head including an electrode for making a seam weld;

a gas shield carried by said welding head in closely surrounding relation to the welding zone of said electrode for engagement with the tube plate to exclude surrounding atmosphere from the welding zone, said shield comprising heat-resisting insulating material, means supporting said welding head and including adjustable means for engaging the tube plate to selectively position said welding head and and electrode in relation to the location of the seam weld, said shield material being flexible to substantially maintain contact with the surface of the tube plate regardless of variations in such surface due to prior welds, and to accommodate the adjustable positioning of said welding head relative to the tube plate, a centering member carried by said welding head for extending into a tube to be welded to a tube plate to center said head as it is rotated to revolve the electrode around the tube, at least a portion of said centering member having a diameter smaller than the inner diameter of the tube to fit freely therein, and a second gas shield carried by said centering member for engagement with the interior surface of the tube to exclude atmosphere from the tube to the welding zone, said second gas shield being carried by the smaller diameter portion of said centering member and comprising heat-resisting insulating material, and said shield material be flexible to accommodate variations in diameter of or irregularities in the tube inner surface.

2. Apparatus according to claim 1 wherein said second gas shield comprises a circular brush.

3. Apparatus according to claim 1 wherein said second gas shield comprises a circular member of woven fabric.

4. Apparatus according to claim 1 wherein said centering member is slidably supported by said head and includes a mandrel portion of a diameter to slidingly fit in a tube to be welded, and said shield carrying smaller diameter portion extending axially of the free end of said mandrel, whereby said centering member may be extended from said head to insert said mandrel into the tube to center the head, and then retracted so that only the reduced diameter portion and shield remain in the tube during the welding operation.

5. Apparatus for welding tubes in openings through tube plates while in an inert gas atmosphere, comprising:

a welding head including an electrode for making a seam weld;

a gas shield carried by said welding head in closely surrounding relation to the welding zone of said electrode for engagement with the tube plate to exclude surrounding atmosphere from the welding zone, said shield comprising heat-resisting insulating material, means supporting said welding head and including adjustable means for engaging the tube plate to selectively position said welding head and electrode in relation to the location of the same weld, said shield material being flexible to substantially maintain contact with the surface of the tube plate regardless of variations in such surface due to prior welds, and to accommodate the adjustable positioning of said welding head relative to the tube plate, said gas shield comprising an annular brush, a centering member carried by said welding head for extending into a tube to be welded to a tube plate to center said head as it is rotated to revolve the electrode around the tube, at least a portion of said centering member having a diameter smaller than the inner diameter of the tube to fit freely therein, and a second gas shield carried by said centering member for engagement with the interior surface of the tube to exclude atmosphere from the tube to the welding zone, said second gas shield being carried by the smaller diameter portion of said centering member and comprising heat-resisting insulating material, and said shield material be flexible to accommodate variations in diameter of or irregularities in the tube inner surface.

6. Apparatus according to claim 5 wherein said second gas shield comprises a circular brush.

7. Apparatus according to claim 5 wherein said second gas shield comprises a circular member of woven fabric.

8. Apparatus according to claim 5 wherein said centering member is slidably supported by said head and includes a mandrel portion of a diameter to slidingly fit in a tube to be welded, and said shield carrying smaller diameter portion extending axially of the free end of said mandrel, whereby said centering member may be extended from said head to insert said mandrel into the tube to center the head, and then retracted so that only the reduced diameter portion and shield remain in the tube during the welding operation.

9. Apparatus for welding tube plates while in an inert gas atmosphere, comprising:

a welding head including an electrode for making a seam weld;

a gas shield carried by said welding head in closely surrounding relation to the welding zone of said electrode for engagement with the tube plate to exclude surrounding atmosphere for the welding zone, said shield comprising heat-resisting insulating material, means supporting said welding head and including adjustable means for engaging the tube plate to selectively position said welding head and electrode in relation to the location of the same weld, said shield material being flexible to substantially maintain contact with the surface of the tube plate regardless of variations in such surface due to prior welds, and to accommodate the adjustable positioning of said welding head relative to the tube plate, said gas shield comprising an annular curtain of woven fabric, a centering member carried by said welding head for extending into a tube to be welded to a tube plate to center said head as it is rotated to revolve the electrode around the tube, at least a portion of said centering member having a diameter smaller than the inner diameter of the tube to fit freely therein, and a second gas shield carried by said centering member for engagement with the interior surface of the tube to exclude atmosphere from the tube to the welding zone, said second gas shield being carried by the smaller diameter portion of said centering member and comprising heat-resisting insulating material, and said shield material be flexible to accommodate variations in diameter of or irregularities in the tube inner surface.

10. Apparatus according to claim 9 wherein said second gas shield comprises a circular brush.

11. Apparatus according to claim 9 wherein said second gas shield comprises a circular member of woven fabric.

12. Apparatus according to claim 9 wherein said centering member is slidably supported by said head and includes a mandrel portion of a diameter to slidingly fit in a tube to be welded, and said shield carrying smaller diameter portion extending axially of the free end of said mandrel, whereby said centering member may be extended from said head to insert said mandrel into the tube to center the head, and then retracted so that only the reduced diameter portion and shield remain in the tube during the welding operation.

* * * * *